(12) United States Patent
Hecht et al.

(10) Patent No.: US 9,776,316 B2
(45) Date of Patent: *Oct. 3, 2017

(54) MACHINE TOOL, IN PARTICULAR HANDHELD MACHINE TOOL

(71) Applicant: Robert Bosch GmbH, Stuttgart (DE)

(72) Inventors: Joachim Hecht, Magstadt (DE); Heiko Roehm, Stuttgart (DE); Martin Kraus, Filderstadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/681,688

(22) Filed: Apr. 8, 2015

(65) Prior Publication Data

US 2015/0209948 A1 Jul. 30, 2015

Related U.S. Application Data

(63) Continuation of application No. 13/143,903, filed as application No. PCT/EP2009/067400 on Dec. 17, 2009, now Pat. No. 9,027,666.

(30) Foreign Application Priority Data

Jan. 16, 2009 (DE) .................. 10 2009 000 267
Nov. 12, 2009 (DE) .................. 10 2009 046 663

(51) Int. Cl.
*B23B 45/00* (2006.01)
*B25F 5/00* (2006.01)
(Continued)

(52) U.S. Cl.
CPC ............. *B25F 5/001* (2013.01); *B23B 45/00* (2013.01); *B23B 45/008* (2013.01); *B25B 21/00* (2013.01);
(Continued)

(58) Field of Classification Search
CPC ......... B23B 31/38; B23B 47/24; B23B 45/00; B25B 21/06; B25B 23/14; B25B 23/147;
(Continued)

(56) References Cited

U.S. PATENT DOCUMENTS 3,757,605 A 9/1973 Morden
4,231,270 A 11/1980 Totsu
(Continued)

FOREIGN PATENT DOCUMENTS

CN 1108170 9/1995
CN 1153873 A 7/1997
(Continued)

OTHER PUBLICATIONS

International Search Report for PCT/EP2009/067400, dated May 25, 2010.

*Primary Examiner* — Scott A. Smith
(74) *Attorney, Agent, or Firm* — Norton Rose Fulbright US LLP; Gerard Messina (57) ABSTRACT

A power tool, in particular a hand-held power tool, preferably embodied as a cordless screwdriver, is equipped with a torque limiting unit in which the release torque is settable by way of a locking brace that is equipped with a spring brace for locking elements that abut axially against parts of a planetary drive, in particular the ring gear thereof or the planet carrier thereof as a last gear stage, the spring elements of the spring brace and the locking elements being located with a radial offset from one another.

23 Claims, 6 Drawing Sheets

(51) Int. Cl.
  *B25B 23/14* (2006.01)
  *B25B 21/00* (2006.01)
  *F16D 7/04* (2006.01)
  *F16D 7/08* (2006.01)

(52) U.S. Cl.
  CPC ............ *B25B 23/14* (2013.01); *B25B 23/141* (2013.01); *F16D 7/044* (2013.01); *F16D 7/08* (2013.01); *B23B 2260/0445* (2013.01)

(58) Field of Classification Search
  CPC ... B23Q 5/58; B25F 5/00; B25F 5/001; F16D 7/04; F16D 7/08
  USPC .......... 173/176, 178, 216, 48, 109; 475/153, 475/263, 265, 266; 81/476, 469, 473; 192/38, 217, 223.2
  See application file for complete search history.

(56) References Cited

U.S. PATENT DOCUMENTS

| | | |
|---|---|---|
| 4,263,996 A | 4/1981 | Putney |
| 4,522,270 A | 6/1985 | Kishi |
| 4,834,192 A | 5/1989 | Hansson |
| 4,892,013 A | 1/1990 | Satoh |
| 4,898,249 A | 2/1990 | Ohmori |
| 5,626,055 A | 5/1997 | Fukui |
| 5,897,454 A | 4/1999 | Cannaliato |
| 6,062,114 A | 5/2000 | Rahm |
| 6,142,243 A | 11/2000 | Mayer |
| 6,688,406 B1 | 2/2004 | Wu et al. |
| 6,702,090 B2 | 3/2004 | Nakamura et al. |
| 7,066,691 B2 | 6/2006 | Doyle et al. |
| 7,225,884 B2 | 6/2007 | Aeberhard |
| 7,469,753 B2 | 12/2008 | Klemm et al. |
| 7,735,575 B2 | 6/2010 | Trautner |
| 7,882,899 B2 | 2/2011 | Borinato et al. |
| 7,980,324 B2 | 7/2011 | Bixler et al. |
| 7,987,922 B2 | 8/2011 | Tokunaga |
| 9,027,666 B2 * | 5/2015 | Hecht .................. B23B 45/008 173/178 |
| 2003/0110910 A1 | 6/2003 | Bader et al. |

FOREIGN PATENT DOCUMENTS

| | | |
|---|---|---|
| CN | 1595790 A | 3/2005 |
| CN | 1785601 A | 6/2006 |
| CN | 101115585 | 1/2008 |
| DE | 2829291 | 1/1979 |
| DE | 3720633 | 1/1988 |
| DE | 10 2004 058 809 | 6/2006 |
| EP | 0787931 | 8/1997 |
| GB | 2124112 | 2/1984 |
| JP | 62-14991 | 1/1987 |
| SU | 608021 | 5/1978 |
| SU | 1284818 | 1/1987 |
| SU | 1452672 | 1/1989 |

\* cited by examiner

MACHINE TOOL, IN PARTICULAR HANDHELD MACHINE TOOL

CROSS-REFERENCE TO RELATED APPLICATIONS

The present application is a continuation application of U.S. patent application Ser. No. 13/143,903, filed on Sep. 22, 2011, now U.S. Pat. No. 9,027,666, which is a national phase of International Patent Application No. PCT/EP2009/067400, filed on Dec. 17, 2009, and claims priority to German Patent Application No. 10 2009 000 267.7, filed on Jan. 16, 2009, and German Patent Application No. 10 2009 046 663.0, filed on Nov. 12, 2009, the contents of each of which are hereby incorporated in the accompanying application by reference in their entireties.

FIELD OF THE INVENTION

The present invention relates to a power tool, in particular to a hand-held power tool.

BACKGROUND

Power tools of this kind, as hand-held tools in the form of cordless screwdrivers, are known from German Patent Application Publication DE 10 2004 058 809 A1. In these tools, a tool receptacle is driven via a multi-stage planetary drive. Provided in the transition to the tool receptacle is a torque limiting unit by which the power flow between motor and tool receptacle is interrupted if the torque being transferred exceeds a predefined set value. The torque limiting unit operates in locking fashion with the aid of a spring brace that, in normal operation, immobilizes the planet carrier of the planetary drive in a rotational position with respect to the housing. Only if the torque to be transferred to the tool receptacle exceeds a set limit value is the planet carrier disengaged, and the power flow to the tool receptacle thereby interrupted.

With this known approach, the locking brace extends in surrounding fashion with respect to the planetary drive, and spring bracing is accomplished with the aid of helical springs that in turn are braced fixedly with respect to the housing and impinge axially, in the transition to a radially protruding edge of the planet carrier, on mutually contiguous locking disks that are fastened nonrotatably and in locking fashion with respect to one another as long as the limit value predefined as a maximum value for the torque is not exceeded. If the limit value is exceeded, the locking connection between the locking disks is then abolished by an axial offset thereof, and torque transfer to the tool receptacle is interrupted. Overall, this kind of arrangement of the locking receptacle, with a surrounding placement with respect to the planetary drive and axial coverage thereof, yields an enclosed configuration for the torque limiting unit, but also a configuration of the power tool that limits its scope of use.

According to a further known approach, the torque limiting unit works with a spring brace, located axially with respect to the ring gear of the planetary drive, by which the locking elements are pushed in locking fashion against an end face of the ring gear.

SUMMARY

Proceeding therefrom, an underlying object of the invention is to enable a shorter overall length for the power tool, in particular by shortening the torque limiting unit.

This object is achieved, according to the present invention, with the features and useful refinements described herein.

With the approach according to the present invention, the locking elements and the spring brace are disposed with a radial offset from one another, i.e. are located next to one another in a radial direction, the locking elements preferably being braced against parts of the planetary drive, in particular on the ring gear or planet carrier. This makes it possible to use a spring brace having at least one spring element that is braced, via a spanning member, in a direction toward the locking elements with a radial offset from the locking elements, against (in a context of preferred end-face bracing) the annular wall of the ring gear or the planet carrier. A planetary drive that is of axially short configuration is thus combined with an axially short locking brace that, depending on the radial location of the locking elements for spring bracing, enables the use of relatively long spring elements as well as a disposition of spring elements that results in a slender configuration of the torque limiting unit. It is thereby also possible, in particular, to use spring elements, whether in the form of ring springs, ring spring packets, but especially also helical springs, whose length is greater than the spacing between the pressure surface of the supporting member, which preferably is displaceable along a housing-side thread, and the pressure surface provided on the locking elements. It is moreover also possible to provide the housing-side thread for the support member (embodied in particular as a compression nut) in axial alignment with the locking elements, in particular approximately with their center circle. The end result of this is a short overall length for the torque limiting unit, in particular its coupling part including the locking system and support member. In addition, short tolerance chains and rigid geometries can be achieved in a context of reliable locking function; the part count is reduced if the gearbox housing is also utilized for guidance of the spring elements, in particular of the helical springs, so that even with long helical springs, spring buckling can be prevented without a great deal of guidance complexity.

With both a radially outwardly and a radially inwardly offset disposition of spring braces, they are preferably disposed concentrically with respect to the locking elements, the radial offset being spanned by a spanning member that is provided as a ring having limbs extending radially between the spring elements and locking elements, so that radial spanning is possible regardless of housing parts located therebetween, and thus also axial bracing of the locking members, in the form of locking balls or studs, against the end face of the annular wall of the ring gear or the planet carrier, even if the spring brace extends partly with a radial overlap with respect to the ring gear.

Especially with regard to a slender configuration of that end of the power tool which tapers toward the tool receptacle, it proves to be useful if the spring brace is disposed with a radially inward offset with respect to the locking elements; for such an approach, it is particularly advantageous to work with axially short spring elements, particularly including ring springs or ring spring packets. In addition, an approach such as this with a very short length also makes possible a particularly simple configuration of the spring guide and spanning member.

The present invention further relates to a torque limiting unit for power tools as such, and makes possible a very compact configuration thereof that is also easy to manage in terms of both design and production engineering.

Further advantages and useful embodiments may be inferred from the description of the Figures.

DETAILED DESCRIPTION

Figure 1:
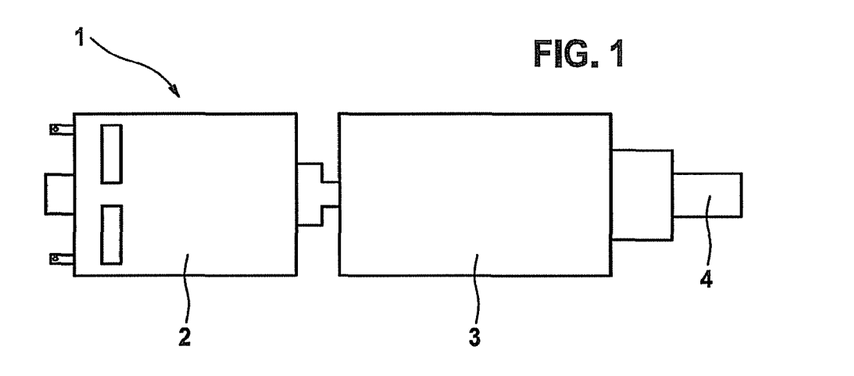
FIG. 1 is a highly schematic depiction of a hand-held power tool having a drive train made up of a drive motor, a gearbox, and a spindle for tool reception.

FIG. 1 depicts, highly schematically, a power tool 1 in its basic configuration as an electrically driven, hand-held power tool, used e.g. as a cordless drill or cordless screw-driver. Important and/or essential components of this power tool 1 are drive motor 2, a gearbox 2, and a spindle 4 that is driven via gearbox 3 and by which drive is imparted to the tool (not depicted) which is received in ordinary fashion in a spindle-mounted chuck. The rotation speed of drive motor 2 is converted by gearbox 3 into the lower drive rotation speed, usually required for practical operation, for the tool. gearbox 3 (see FIGS. 4 and 6) is embodied in particular as a planetary drive 48, preferably configured with multiple stages and switchably, and as it transitions to spindle 4 tapers into a torque limiting unit 5 that is visible, in particular with regard to its locking brace 6, in simplified partial depictions in FIGS. 2 and 3 and, corresponding thereto, FIG. 8.

Figure 4:
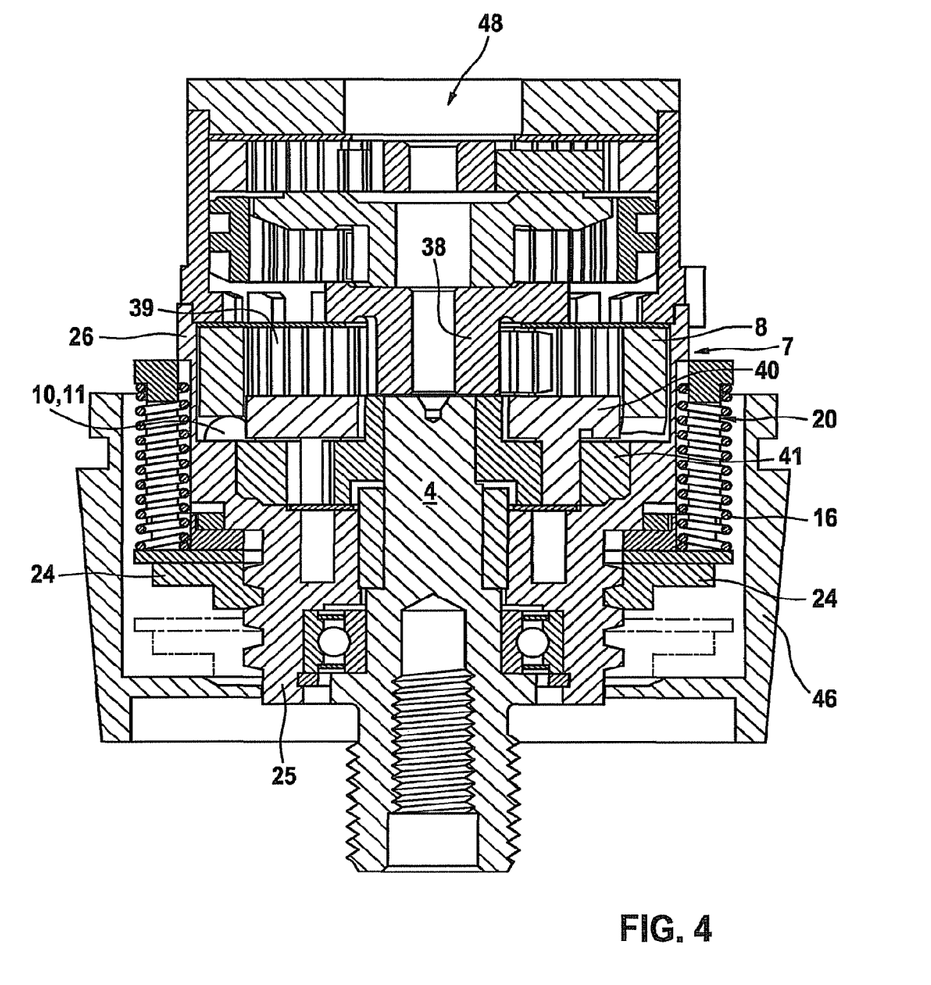
FIG. 4 is a simplified longitudinal section of the front gearbox region tapering toward the tool receptacle.
Figure 6:
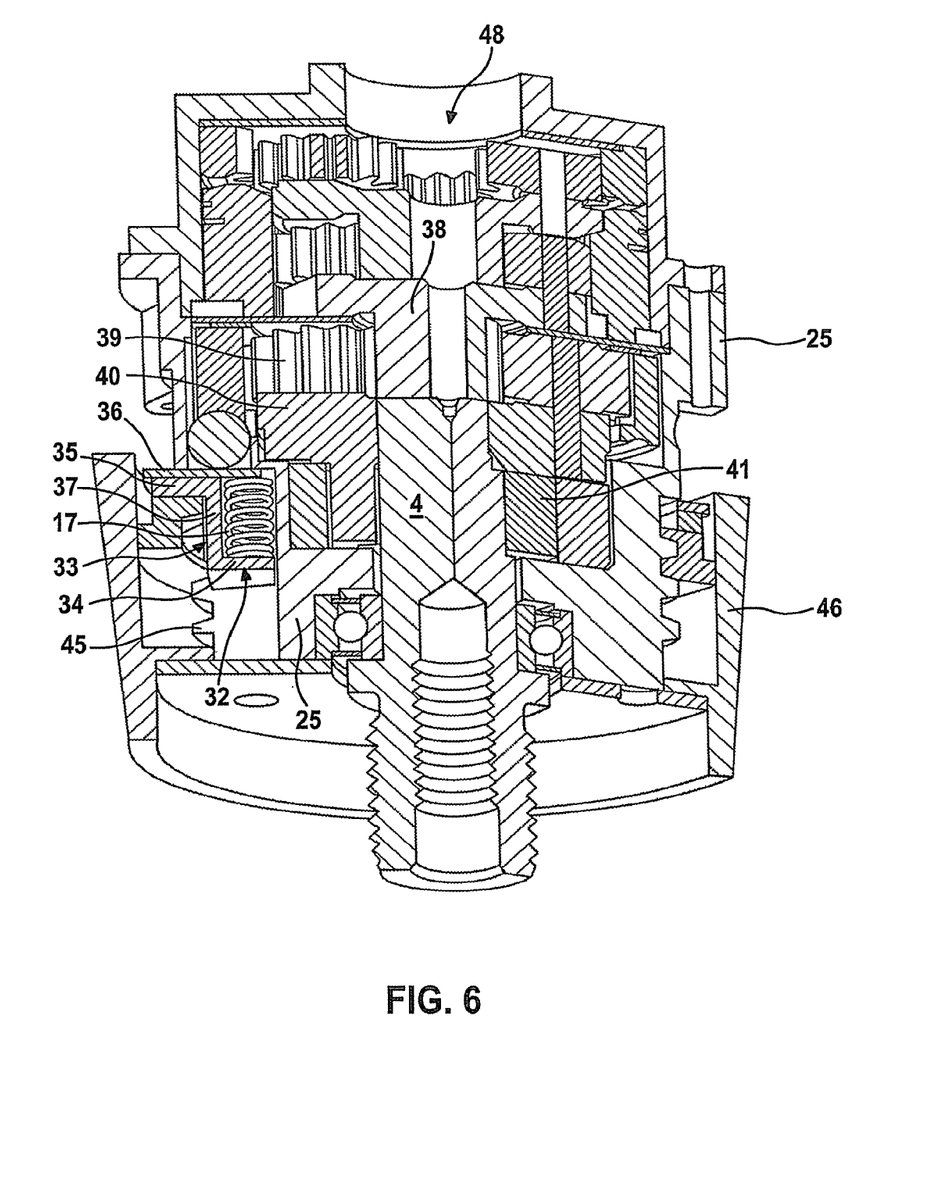
FIG. 6 is a depiction, corresponding to FIG. 4, of a further embodiment.

FIGS. 4 and 6 show the multi-stage configuration of gearbox 3, embodied as a planetary drive 48, that will be further explained below only with regard to its last gear stage 7, located on the input side to torque limiting unit 5, which in these depictions is part of locking brace 6 in terms of its ring gear 8.

Figure 2:
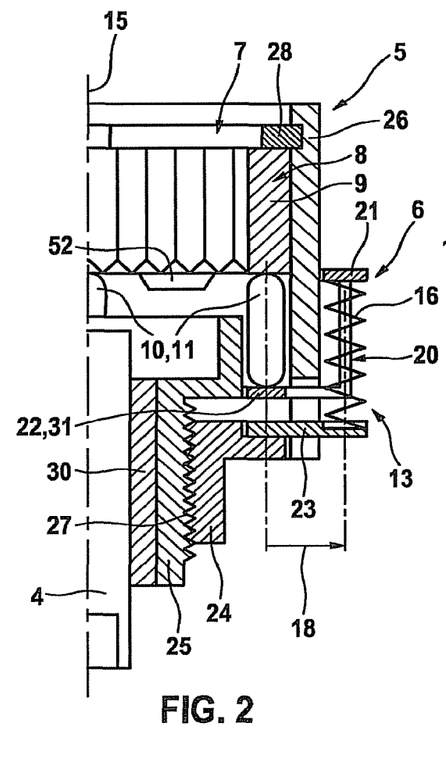
FIGS. 2 and 3 are highly simplified, schematic partial depictions of the gearbox region that tapers toward the spindle for tool reception, having a torque limiting unit disposed in said gearbox region.
Figure 3:
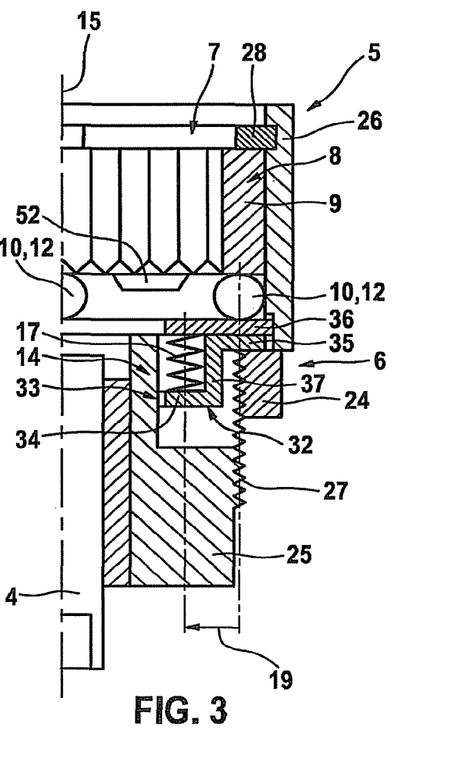

All that is shown of this last gear stage 7 in FIGS. 2 and 3, as part of locking brace 6, is ring gear 8, whose annular wall 9 is equipped on the end face with locking lugs 52 that interact with locking elements 10. Provided as locking elements 10 are locking studs 11 in FIG. 2 and locking balls 12 in FIG. 3, which are pressed respectively by a spring brace 13 according to FIGS. 2 and 14 according to FIG. 3 axially, and in the present case parallel to gearbox axis 15, against the end face of annular wall 9 of ring gear 8.

Spring braces 13 and 14 have respective spring elements 16, 17 that, in the exemplifying embodiment as helical springs, are distributed over the circumference of ring gear 8 at a distance from one another. Spring elements 16, 17 can each also be constituted by individual springs or spring pairs of a different configuration, and instead of a plurality of spring elements 16, 17 distributed over the circumference, it is also possible to use ring springs, if applicable also ring spring packets.

A feature common to torque limiting unit 5 according to FIG. 2 and FIG. 3 in the configuration according to the present invention is the radially offset disposition of spring braces 13, 14, with their spring elements 16, 17, with respect to locking elements 10 in their embodiment as locking studs 11 or locking balls 12. In FIG. 2 the respective spring elements 16 of spring brace 13 are disposed with a radial outward offset with respect to locking elements 10 constituted by a locking studs 11, and this offset is illustrated in FIG. 2 by arrow 18. FIG. 3 shows a configuration that corresponds in principle but has a radially inward offset of spring brace 14, with spring element 17, with respect to locking elements 10 constituted by locking balls 12, illustrated by arrow 19.

It is evident from FIG. 2, with regard to the design shown there having a spring brace 13 offset radially outward with respect to locking element 10, that spring elements 16 are each disposed on a spring carrier 20 that extends in annularly surrounding fashion with respect to locking elements 10 and has, in the radial overlap region with respect to locking elements 10, spring supports 21 extending in an axial direction 15, provided at their bottom end with radially inwardly projecting supporting limbs 22 against which locking elements 10 abut oppositely to the end face of annular wall 9 of ring gear 8. Spring supports 21 and supporting limbs 22 thus form substantially angular spanning members 31 that are connected annularly in a circumferential direction.

At the bottom end the respective spring element 16 that is held on a spring support 21 and braced at the top end is braced in its lower (in the drawing) region protruding beyond spring carrier 20, i.e. in the opposite direction from ring gear 8, on an annular spring guide 23 that is in turn carried by a support member 24 that is displaceable in an axial direction and takes on the function of a compression nut. Support member 24 is disposed on a housing part 25 of gearbox housing 26 that is provided surroundingly with respect to ring gear 8, and is axially displaceable with respect to housing 26, via a threaded connection 27, in the direction of axis 15. The axial spacing between the annular spring guide 23 and spring carrier 20, on whose spring supports 21 the spring elements 16 are oppositely braced, is thereby modified. It is thus possible, by axial displacement of support member 24, with spring guide 23, with respect to spring brace 13, to determine the axial preload with which locking elements 10 abut against the end face of ring gear 8, which is braced, axially opposite to locking elements 10, against gearbox housing 26; in the exemplifying embodiment, this is illustrated by way of a clamping ring 28 engaging into an annular groove of housing 26. Also mounted in gearbox housing 26, opposite its housing part 25 as graphically depicted in FIG. 2, is spindle 4, which is equipped with or connected to a tool receptacle and is braced with respect to housing part 25 by way of a bearing 30, in particular a plain bearing.

FIG. 2 illustrates that as a result of the axial displacement of support member 24, not only is the preload force of locking brace 6 settable, but locking brace 6 can ultimately also be immobilized when supporting member 24 abuts against supporting limb 22, thus yielding direct bracing of supporting member 24 via locking elements 10 with respect to ring gear 8, by which ring gear 8 is immobilized.

Figure 5:
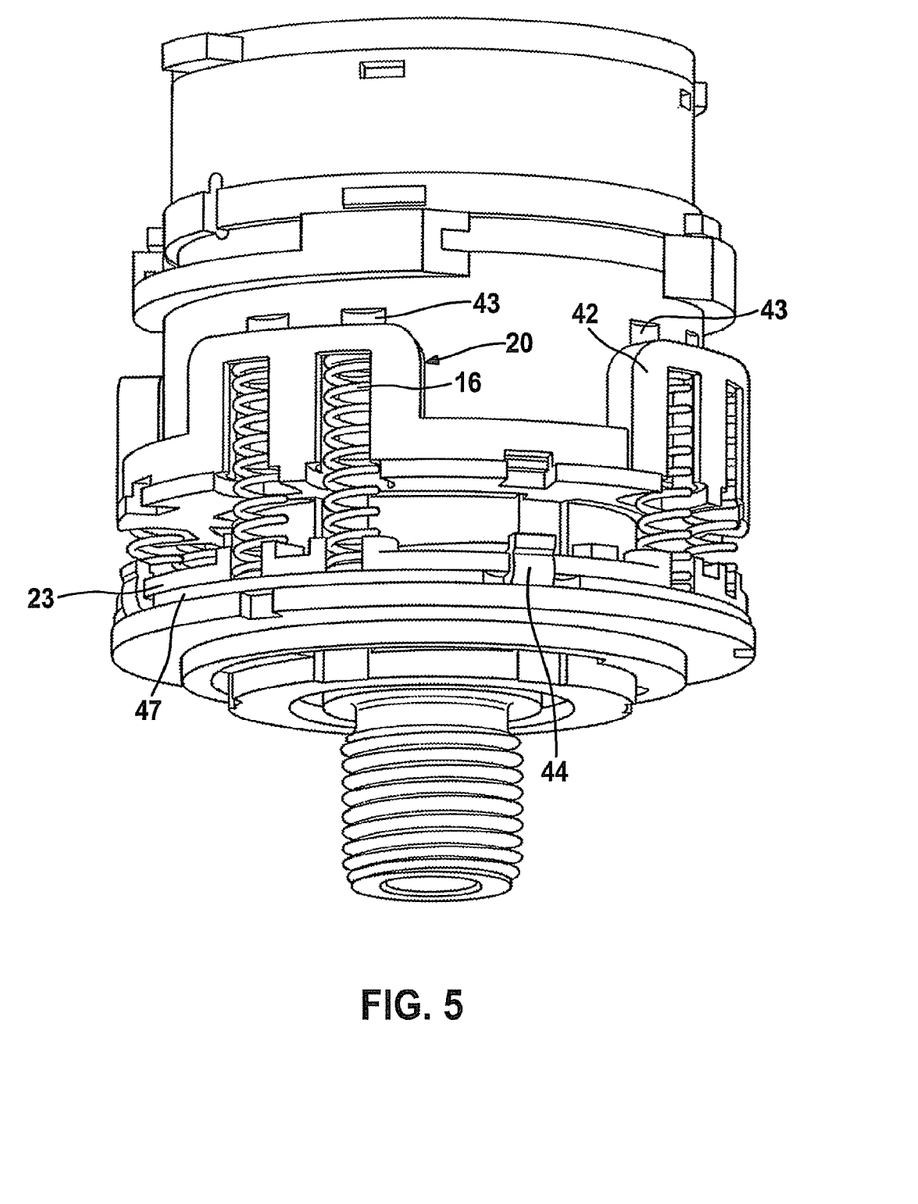
FIG. 5 is a perspective view of the gearbox region according to FIG. 4, the surrounding tool housing being (as in FIG. 4) not shown.

It is also evident from FIG. 2 that spring guide 23 is retained axially shiftably but nonrotatably with respect to gearbox housing 26; as indicated in FIG. 5, this can be achieved in terms of spring carrier 20, inter alia, by the fact that the latter rests, with its springs 16 carried via spring supports 21, in guide depressions 43 of gearbox housing 26, and/or that corresponding axial guides are provided for locking elements 10 on housing 26 (this is not shown).

An approach largely corresponding to FIG. 2 with regard to function is shown by FIG. 3, which nevertheless differs in principle in that the radial offset of spring braces 14, with spring elements 17, with respect to locking elements 10 is radially inward, in contrast to radially outward in FIG. 2.

Whereas in the embodiment according to FIG. 2 spring brace 13 is embodied by a spring carrier 20 having axially extending spring supports 21 and radially extending supporting limbs 22 as spanning members 31, in the embodiment according to FIG. 3 spring brace 14 is constituted by an annular spring carrier 32 as spanning member 33 that comprises, projecting radially inward, supporting limbs 34 that engage under spring element 17 and a radially outwardly protruding cantilever limb 35; supporting limbs 34 and cantilever limb 35 are offset axially from one another, and the annular cantilever limb 35 is braced against a carrier ring 36 that is fastened nonrotatably with respect to housing 26 and on which locking elements 10 are braced oppositely to cantilever limb 35. The respective spring element 17 is braced on carrier ring 36 with a radially inward offset with respect to cantilever limb 35, and is thus axially clamped between carrier ring 36 and supporting limb 34. Supporting member 24, which is disposed on housing part 25 axially displaceably by way of a threaded connection 27 and which is preferably once again constituted by a compression nut, is axially braced against cantilever limb 35, analogously to FIG. 2.

FIG. 3 depicts a situation in which torque limiting unit 5 has become immobilized and is thus rendered non-operational, by the fact that by way of supporting member 24 and by way of cantilever limb 35 and carrier ring 36 located therebetween, locking element 10 is pressed in locking fashion against the end wall of ring gear 8 in such a way that a nonrotatable connection is produced. If supporting member 24 is moved out of this position downward in FIG. 3 (adjusting ring 46 serves this purpose; see FIGS. 4 and 6), locking element 10 is then impinged upon by a clamping force determined only by the force of spring element 17, so that by way of the axial location of supporting member 24, a respective limit value for torque limiting unit 5 can be set. This is illustrated by FIG. 2.

In the embodiment according to FIG. 3, spanning member 33 has a basic shape that is respectively Z-shaped in cross section, with radially inwardly protruding supporting limbs 34 and a cantilever limb 35 connected to supporting limbs 34 via respective axially extending struts 37, such that supporting limbs 34 are located with an overlap with regard to respective spring elements 17.

Figure 7:
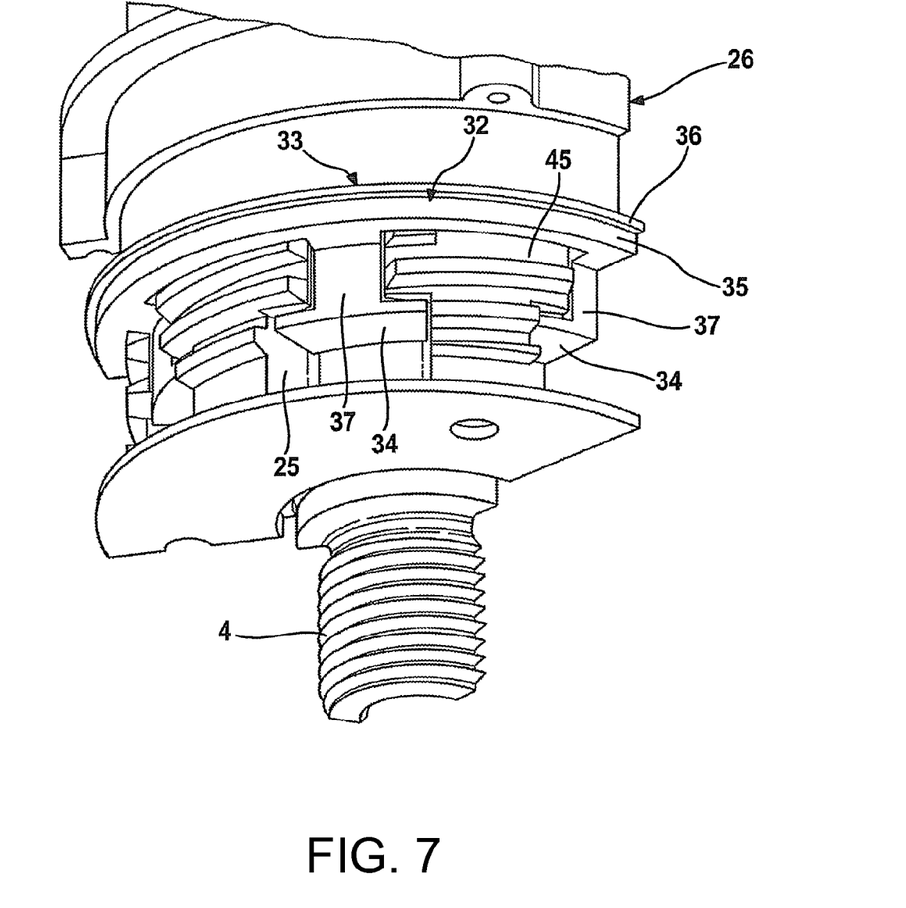
FIG. 7 is a partial view of the depiction according to FIG. 6.

A configuration, corresponding to the schematic depictions according to FIGS. 2 and 3, of the front part of gearbox 3 that tapers toward the tool receptacle and has an associated torque limiting unit 5 is shown by FIGS. 4 and 5 corresponding to FIG. 2, and FIGS. 6 and 7 corresponding to FIG. 3. The same reference characters are respectively used in this regard, so that the corresponding configuration can be recognized on the basis of those reference characters and the functional description referring to FIGS. 2 and 3.

Additionally evident from FIGS. 4 to 7 is the configuration of the gear stage pertinent, with its ring gear 8, to torque limiting unit 5, the central sun wheel 38 of which stage meshes with planet wheels 39 of a planet carrier 40 that is nonrotatably connected to an output drive star 41 and by way of that to spindle 4.

FIG. 5 further illustrates a practically useful configuration of spring brace 13 with a paired disposition of spring elements 16 in housing-like receptacles 42 that at least largely assume lateral guidance of spring elements 16 and thus prevent them from buckling. At least with regard to gearbox housing 26, this guide can also be constituted by gearbox housing 26 itself, which for this purpose is usefully provided with corresponding guide depressions 43, in particular trough-shaped guide depressions 43, resulting in bracing between spring brace 13 and gearbox housing 26 in the circumferential direction as well. FIG. 5 further illustrates the fact that the annular spring guide 23 can be axially laid against spring carrier 20 and caught on it by way of locking hooks 44, and can thus be connected to yield a unit that encloses spring elements 16 in clamped fashion. Locking hooks 44 are disposed on a disk 47 that engages under spring guide 23.

FIGS. 6 and 7 make visible in particular, in a manner supplementing FIG. 3, the configuration of Z-shaped spanning member 33, specifically with its annular cantilever limb 35 that sits on carrier ring 36, further with its axially extending strut 37 proceeding from the annular cantilever limb 35 and its radially inwardly emergent supporting limbs 34 on which spring 17 (not visible in FIG. 7) is respectively braced. For supporting member 24, lower housing part 25 is equipped with a thread 45 in the overlap region with struts 37.

Figure 8:
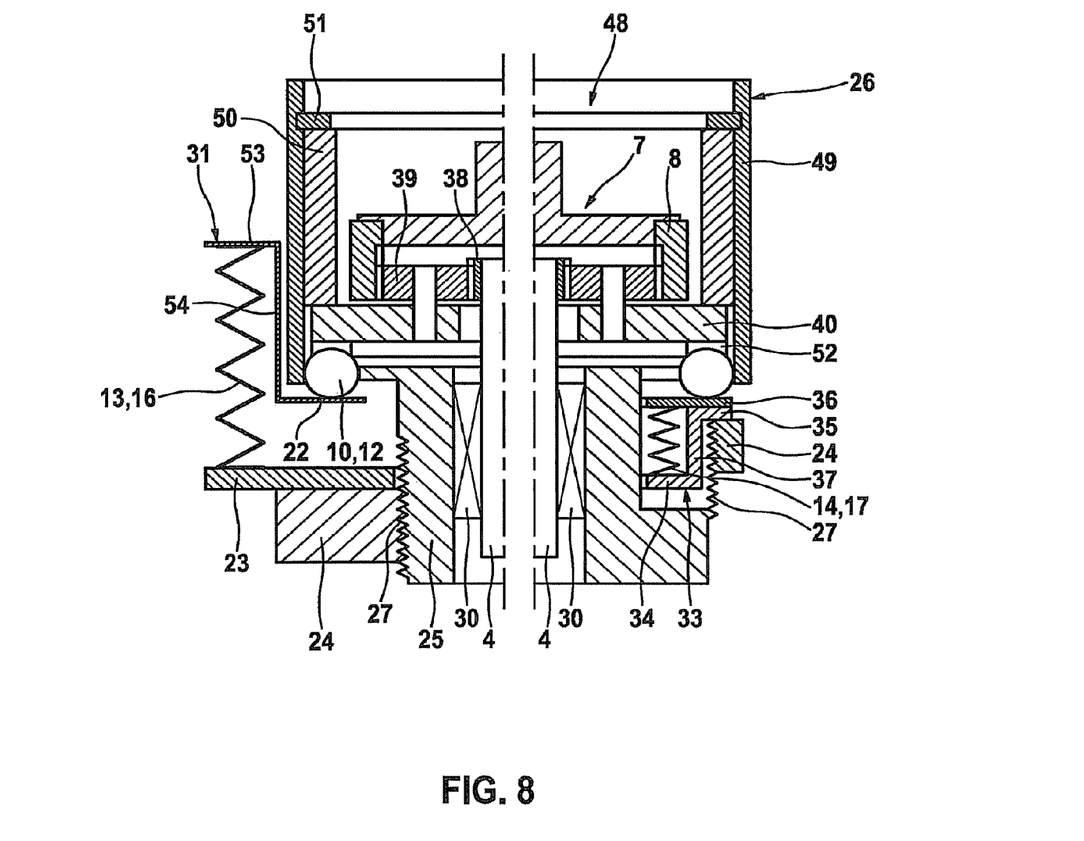
FIG. 8 is a schematic depiction, corresponding to the depictions of FIGS. 2 and 3, in which the planet carrier is provided as a part of the planetary drive impinged upon by the locking elements; in the left half of the depiction, analogously with FIG. 2, the spring brace is illustrated in a position offset radially outward with respect to the locking elements, and in the left half of the depiction, analogously to FIG. 3, in a position offset radially inward.

In the case of the exemplifying embodiments depicted with further simplification in FIG. 8, explanation of which refers back largely to the reference characters already used previously, locking elements 10 depicted as locking balls 12 are braced on the side of planetary drive 48 (illustrated with its last gear stage 7) not against ring gear 8, as shown in FIGS. 2 to 7, but against planet carrier 40 of planetary drive 48. In this depiction, planet carrier 40 protrudes radially outward beyond ring gear 8 and extends into the vicinity of a peripheral wall 49 of gearbox housing 26, against which it is axially braced oppositely to locking elements 10. The bracing is illustrated by way of a bracing sleeve 50 that is fastened axially with respect to peripheral wall 49 by way of a securing ring 51.

Planet carrier 40 drives, via sun wheel 38, spindle 4 that is mounted via bearing 30 in housing part 25 that tapers toward the tool receptacle (not depicted). Supporting member 24, by way of which spring element 16 or 17 of the respective spring brace 13 or 14 is settable in terms of the supporting force with which the respective locking element 10 is braced against planet carrier 40 equipped with a locking lugs 52, is displaceable along said housing part 25.

On the left side of FIG. 8, spring brace 13 is located with a radially outward offset with respect to locking element 10, while on the right side the radially inwardly offset location of spring brace 14 with respect to locking element 10 is illustrated, by analogy with the depictions in FIGS. 2 and 3.

Referring to the radially outwardly offset spring brace 13 shown on the left, its spring element 16 is clamped between an annular spring guide 23 resting on supporting member 24 and a spanning member 31 (depicted only schematically) that has a radial supporting limb 22 engaging under locking element 10 and a carrier limb 53, located with an axial offset with respect thereto in the overlap region with respect to peripheral wall 49 of housing 26 and protruding radially outward; in combination with a strut part 54 extending axially and proceeding between supporting member 24 and carrier limb 53, this results in a Z-shaped cross-sectional contour for the annular spanning member 31. As also already explained with reference to FIG. 2, a configuration of this kind allows long spring travels; any guidance that may be necessary for the spring element can be associated, in a manner not depicted, with spanning member 31, which can extend with its strut part 54 axially so as to cover the gear stage that is depicted.

FIG. 8 shows on the right side, in the same basic configuration analogous to FIG. 3, the radially inwardly offset location of spring brace 14 with respect to locking elements 10; here as well, spanning member 33 is configured as an annular element having a Z-shaped cross section. It has at the transition to locking element 10 a radially outwardly protruding cantilever limb 35 and a radially inwardly protruding supporting limb 34; of these, supporting limb 34 is set back axially with respect to cantilever limb 35 toward the side facing away from locking elements 10, thus yielding, offset radially inward with respect to locking element 10 and along strut 37 that connects cantilever limb 35 to supporting limb 34, a protected receiving space for spring element or elements 17 disposed therein. Usefully, a carrier ring 36 is disposed between locking elements 10 and cantilever limb 35, enabling at least cantilever limb 35 of the annular spanning member 33 also to be embodied in segmented fashion. An approach of this kind makes possible overall a particularly compact configuration that is also suitable in particular for spring elements 17 in ring form.

What is claimed is:

1. A power tool, comprising:
a tool spindle including a drive; and
a torque limiting unit disposed in the drive of the tool spindle and received in a housing, the torque limiting unit including
locking elements configured to disengage the drive when a release torque is exceeded,
an axial locking brace comprising at least one spring brace exerting a spring force on the locking elements, the at least one spring brace including a plurality of spring elements, and
a support member bracing the axial locking brace with respect to the housing, the support member being displaceable in an axial direction with respect to the housing in order to adjust and set the release torque,
wherein the locking elements and the plurality of spring elements of the spring brace are radially offset from each other,
wherein the plurality of spring elements of the spring brace are braced with respect to the radially offset locking elements via a spanning member,
wherein the spanning member is embodied as a spring carrier having limbs extending radially between the plurality of spring elements and the locking elements.

2. The power tool of claim 1, wherein the power tool is a hand-held power tool.

3. The power tool as recited in claim 1, further comprising:
a planetary drive, the locking elements being braced against a part of the planetary drive.

4. The power tool as recited in claim 3, wherein the locking elements are braced against (a) a ring gear of the planetary drive or (b) a planet carrier of the planetary drive.

5. The power tool as recited in claim 1, wherein the plurality of spring elements of the spring brace have a spring length which in an installed state is greater than a distance between a pressure face of the support member and a pressure face associated with the locking elements.

6. The power tool as recited in claim 1, wherein the plurality of spring elements of the spring brace are disposed with a radial outward offset with respect to the locking elements.

7. The power tool as recited in claim 6, wherein the plurality of spring elements is disposed with an axial overlap with respect to the locking elements.

8. The power tool as recited in claim 1, wherein the plurality of spring elements of the spring brace are disposed with a radial inward offset with respect to the locking elements.

9. The power tool as recited in claim 1, wherein the spanning member is embodied as an annular spring carrier including at least one radially inwardly projecting supporting limb configured to support the plurality of spring elements and at least one radially outwardly protruding cantilever limb configured to support the support member.

10. The power tool as recited in claim 9, wherein the at least one supporting limb and the at least one cantilever limb are disposed axially offset from each other and are connected to one another by an axially extending strut.

11. The power tool as recited in claim 9, wherein the plurality of spring elements are axially clamped between the at least one supporting limb and a carrier.

12. The power tool as recited in claim 11, wherein the plurality of spring elements are braced on a first face of the carrier ring and the locking elements are braced on a second face, opposite to the first face, of the carrier ring.

13. The power tool as recited in claim 1, wherein the plurality of spring elements of the spring brace are braced on a first face of a carrier ring and the locking elements are braced on a second face, opposite to the first face, of the carrier ring.

14. The power tool as recited in claim 13, wherein the plurality of spring elements are disposed with a radial inward offset with respect to the locking elements.

15. The power tool as recited in claim 1, wherein the support member is embodied as a compression nut having a threaded connection to the housing, the threaded connection located in axial alignment with the locking elements.

16. The power tool as recited in claim 1, wherein the spanning member is embodied as an angular spanning member including at least one axially extending spring support and at least one radially inwardly projecting supporting limb.

17. A power tool, comprising:
a tool spindle including a drive; and
a torque limiting unit disposed in the drive of the tool spindle and received in a housing, the torque limiting unit including
locking elements configured to disengage the drive when a release torque is exceeded,
an axial locking brace comprising at least one spring brace exerting a spring force on the locking elements, the at least one spring brace including a plurality of spring elements, and
a support member bracing the axial locking brace with respect to the housing, the support member being displaceable in an axial direction with respect to the housing in order to adjust and set the release torque,
wherein the locking elements and the plurality of spring elements of the spring brace are radially offset from each other, wherein the plurality of spring elements of the spring brace are braced with respect to the radially offset locking elements via a spanning member, wherein the spanning member is embodied as a spring carrier including at least one axially extending spring support configured to support the plurality of spring elements on a first end and at least one radially inwardly extending supporting limb configured to support the locking elements.

18. The power tool as recited in claim 17, wherein a second end of the plurality of spring elements are supported on a spring guide.

19. The power tool as recited in claim 18, wherein the support member is braced at least indirectly on the spring guide.

20. A power tool, comprising:
a tool spindle including a drive; and
a torque limiting unit disposed in the drive of the tool spindle and received in a housing, the torque limiting unit including
  locking elements configured to disengage the drive when a release torque is exceeded,
  an axial locking brace comprising at least one spring brace exerting a spring force on the locking elements, the at least one spring brace including at least one spring element, and
  a support member bracing the axial locking brace with respect to the housing, the support member being displaceable in an axial direction with respect to the housing in order to adjust and set the release torque,
  wherein the locking elements and the at least one spring element of the spring brace are radially offset from each other,
  wherein the at least one spring element of the spring brace is braced with respect to the radially offset locking elements via a spanning member,
  wherein the spanning member is embodied as a spring carrier having limbs extending radially between the at least one spring element and the locking elements.

21. A power tool, comprising:
a tool spindle including a drive; and
a torque limiting unit disposed in the drive of the tool spindle and received in a housing, the torque limiting unit including
  locking elements configured to disengage the drive when a release torque is exceeded,
  an axial locking brace comprising at least one spring brace exerting a spring force on the locking elements, the at least one spring brace including at least one spring element, and
  a support member bracing the axial locking brace with respect to the housing, the support member being displaceable in an axial direction with respect to the housing in order to adjust and set the release torque,
  wherein the locking elements and the at least one spring element of the spring brace are radially offset from each other,
  wherein the at least one spring element of the spring brace is braced with respect to the radially offset locking elements via a spanning member,
  wherein the spanning member is embodied as an annular spring carrier including at least one radially inwardly projecting supporting limb configured to support the at least one spring element and at least one radially outwardly protruding cantilever limb configured to support the support member.

22. A power tool, comprising:
a tool spindle including a drive; and
a torque limiting unit disposed in the drive of the tool spindle and received in a housing, the torque limiting unit including
  locking elements configured to disengage the drive when a release torque is exceeded,
  an axial locking brace comprising at least one spring brace exerting a spring force on the locking elements, the at least one spring brace including at least one spring element, and
  a support member bracing the axial locking brace with respect to the housing, the support member being displaceable in an axial direction with respect to the housing in order to adjust and set the release torque,
  wherein the locking elements and the at least one spring element of the spring brace are radially offset from each other,
  wherein the at least one spring element of the spring brace is disposed with a radial outward offset with respect to the locking elements,
  wherein the at least one spring element is disposed with an axial overlap with respect to the locking elements.

23. A power tool, comprising:
a tool spindle including a drive; and
a torque limiting unit disposed in the drive of the tool spindle and received in a housing, the torque limiting unit including
  locking elements configured to disengage the drive when a release torque is exceeded,
  an axial locking brace comprising at least one spring brace exerting a spring force on the locking elements, the at least one spring brace including at least one spring element, and
  a support member bracing the axial locking brace with respect to the housing, the support member being displaceable in an axial direction with respect to the housing in order to adjust and set the release torque,
  wherein the locking elements and the at least one spring element of the spring brace are radially offset from each other,
  wherein the at least one spring element of the spring brace is braced with respect to the radially offset locking elements via a spanning member,
wherein the spanning member is embodied as an angular spanning member including at least one axially extending spring support and at least one radially inwardly projecting supporting limb.

* * * * *